Oct. 8, 1940. W. J. MacFEE 2,217,557
TREE PROTECTOR
Filed Oct. 31, 1939 2 Sheets-Sheet 1
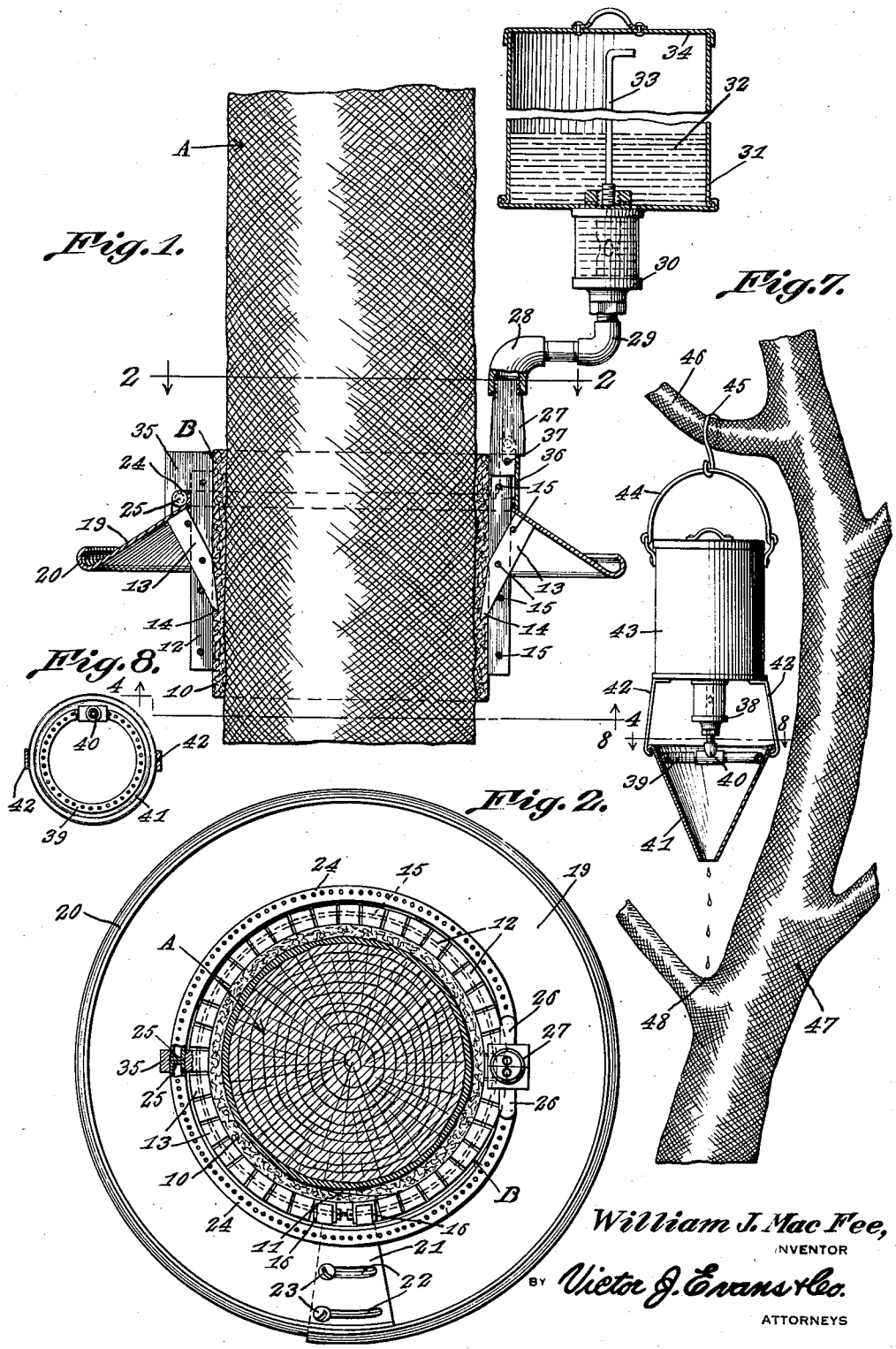
William J. Mac Fee,
INVENTOR
BY Victor J. Evans & Co.
ATTORNEYS

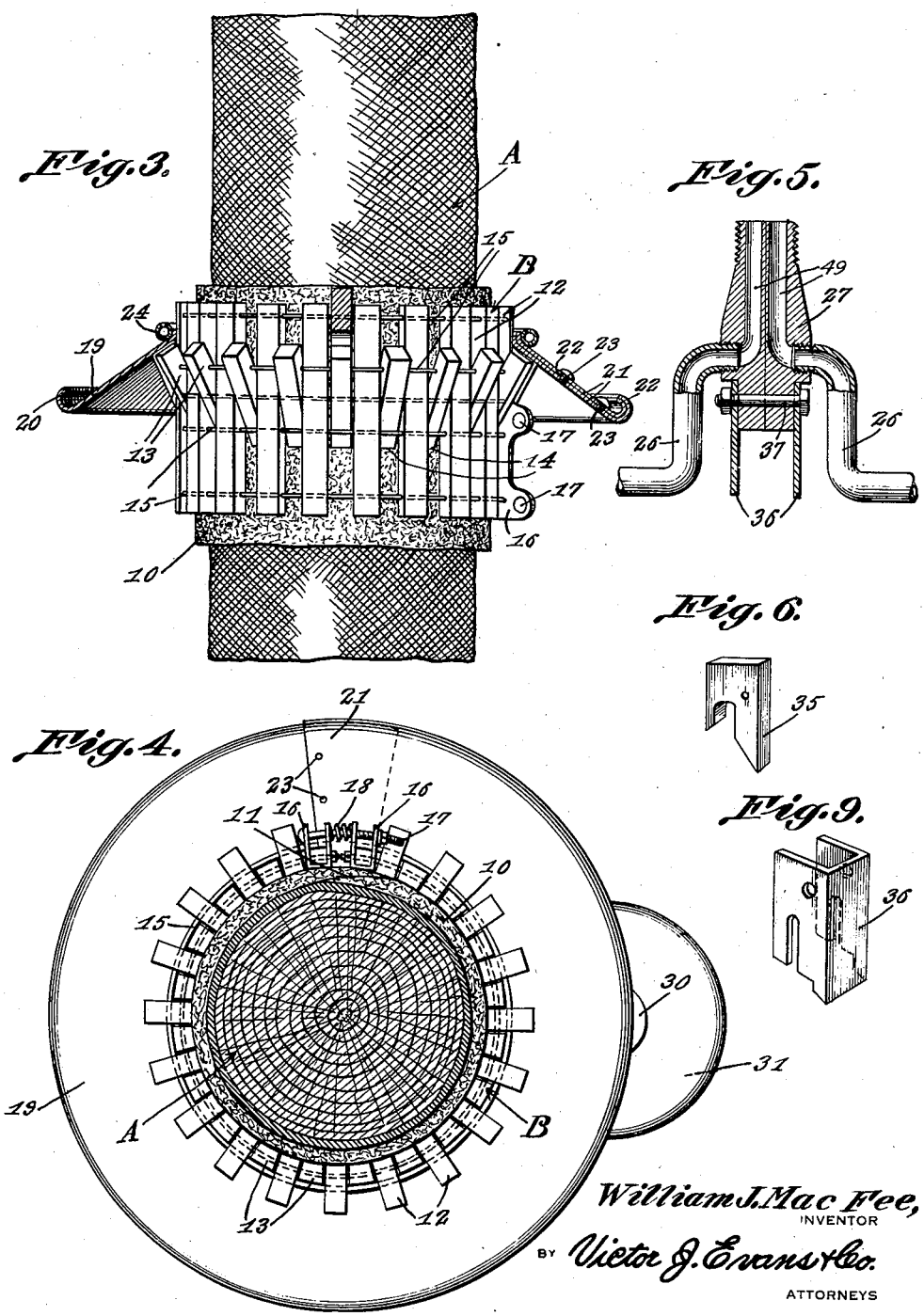

Patented Oct. 8, 1940

2,217,557

UNITED STATES PATENT OFFICE 2,217,557

TREE PROTECTOR

William J. MacFee, Schenectady, N. Y.

Application October 31, 1939, Serial No. 302,237

8 Claims. (Cl. 43—108)

The invention relates to a tree protector and more especially to an insect barrier for trees.

The primary object of the invention is the provision of a device of this character, wherein the same when applied to a tree trunk will prevent insects from crawling upwardly of said trunk or reaching the foliage or limbs of such tree and thereby protecting it from damage by said insects.

Another object of the invention is the provision of a device of this character, wherein the construction thereof is novel in its entirety in that an absorbent band is held in embracing relation to the trunk of a tree and has associated therewith a liquid dispenser containing poisonous fluid or liquid which is distributed thereby for absorption by such band so that insects making contact therewith will be killed and in this way such insects will be retarded in their travel upwardly of the trunk of a tree for the damaging of its limbs and foliage which results in destruction thereof or the growth of the same.

A further object of the invention is the provision of a device of this character, wherein the same does not retard the growth of the tree by strangling the trunk thereof in that it is extensible consistently with the growth of the trunk of such tree and will fully protect the tree from insects, being a barrier to such insects when crawling upwardly of the trunk of said tree.

A still further object of the invention is the provision of a device of this character, wherein the application thereof to the tree or its removal therefrom can be had without excessive labor and does not require an artificer in that connection, the tree being fully protected against attack by insects and thereby stimulating the growth of the tree without damage thereto by such insects.

A still further object of the invention is the provision of a device of this character, which is comparatively simple in its construction, thoroughly reliable and efficient in operation, requiring but little attention, assuring protection against insects, durable, and inexpensive to manufacture and install.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a fragmentary elevation of the trunk of a tree showing the device constructed in accordance with the invention partly in section and applied to the tree trunk.

Figure 2 is a sectional view taken on the line 2—2 of Figure 1 looking in the direction of the arrows.

Figure 3 is a side elevation partly in section of the device as applied, the sectional portion being at substantially right angles to that shown in Figure 1.

Figure 4 is a sectional view taken on the line 4—4 of Figure 1 looking in the direction of the arrows.

Figure 5 is a fragmentary vertical sectional view through the liquid dispensing distributor coupling employed in the device.

Figure 6 is a perspective view of a hold-down jaw used in the device.

Figure 7 is a fragmentary elevation of a tree showing a modified form of the device applied thereto.

Figure 8 is a sectional view on the line 8—8 of Figure 7 looking in the direction of the arrows.

Figure 9 is a perspective view of another hold-down jaw employed in the device disclosed in Figures 1, 2 and 3.

Similar reference characters indicate corresponding parts throughout the several views in the drawings.

Referring to the drawings in detail, particularly Figures 1 to 6 and 9, inclusive, A designates generally a portion of the trunk of a growing tree and B the protector or device constructed in accordance with the invention and in the preferred embodiment thereof. This device B comprises a band 10 of absorbent fibrous material, being of the required width and length and is trained about the trunk A of the tree with the meeting ends 11 thereof in overlapped relation to each other so that this band snugly and tightly embraces the said trunk of the tree.

Concentrically about the band 10, when applied to the trunk A of the tree, is a fencing involving a plurality of staves 12 while located between the major number of these staves are downwardly convergent gripper and supporting blocks 13, each having the beveled pointed end 14 adapted to bite into the band 10, the staves 12 and the gripper and supporting blocks 13 being strung upon connector wires 15, which are carried transversely through these in the stringing thereof, and the ends of said wires 15 are anchored in substantially U-shaped terminal members 16, these being occupied by a pair of staves 12. Associated with the members 16 are tie bolts 17, these being loosely fitted therewith and each is passed through a coiled tensioning spring 18 yieldably coupling the pair of members 16 to each other and in this manner the fence embraces the band 10, being concentrically about the same so that the said band 10 will be clamped about the trunk A of the tree, as is clearly shown in Figures 1, 2, 3 and 4 of the drawings.

Concentrically about the fence involving the staves 12 at the upper portion thereof is a conoidal expansible hood or shield 19 having the upwardly and inwardly curled outer peripheral edge 20 effecting a trough at the upper side thereof, the extension of the said shield 19 being had by disposing the ends 21 in overlapped relation to each other and one of these ends is provided with elongated slots 22 accommodating fasteners in the form of screws 23 fixedly fitted in the other end of said shield. The shield in its concentrically arranged relationship to the fence rests upon the blocks 13 at the upper ends thereof and in this manner the shield is supported about the fence.

Above the shield 19 and encircling the fence constituted by the staves 12 are substantially half circular perforated pipe sections 24, these having the closed ends 25 adjacent to each other abutting one another while the other ends of said pipe sections 24 are formed with goose necks 26 and are tapped into a two-part coupling nipple 27, which is threaded in a union 28 of an elbow pipe 29 separably coupled with a dripolater font 30 of a liquid feed reservoir 31 containing a poisonous liquid 32 and its feed into the font 30 being controlled by a needle valve, the adjusting stem thereof being indicated at 33, and is accessible on removal of the detachable cap or cover 34 fitting said reservoir 31. The poisonous liquid 32 within the reservoir 31 is delivered into the pipe sections 24 whence it is distributed therefrom onto the shield 19, being troughed at 20, and a quantity of this liquid is absorbed by the band 10 for saturating the same. The poisonous liquid kills insects when crawling upon the tree trunk in the direction of the band 10 and the shield 19, either below or above the same, yet such band and shield obviate the upward crawling of the insects upon the trunk A when below the band as the device constitutes a barrier against upward crawling of such insects on the trunk of the tree.

Engaged with the pipe sections 24 are the clamping jaws 35 and 36, respectively, the latter jaw being bolted at 37 to the two parts of the coupling 27, and these jaws 35 and 36 are strung upon the wire 15 uppermost of the fence constituted by the staves 12. The jaws 35 and 36 in their working hold the pipe sections 24 in proper relation to the shield 19 and trained about the fence constituted by the staves 12.

In Figures 7 and 8 of the drawings there is shown a modification wherein the dripolater font 38, on detachment of the elbow 29 therefrom, as is shown in Figure 1, has a perforated ring pipe 39 coupled at 40 therewith and this pipe 39 is located within the wider end of a drip funnel 41 hung by hangers 42 from a reservoir 43, it having a bail handle 44 engaged with a hook 45 attached to a limb 46 of a tree 47. The funnel in its association with the reservoir 43 is directly above the crotch 48 of the limb 46 of the tree 47 so that poisonous liquid will be caused to drip onto the crotch 48 for the killing of insects infested at such point. The reservoir 43 contains the poisonous liquid to be fed to the ring pipe 39 whence droppings therefrom will be directed by the funnel 41 to the point desired of the tree.

The poisonous substance will kill or exterminate insects crawling upon the tree so that the latter will be prevented from damaging such tree, either in its destruction or in stalling the growth thereof.

The blocks 13 being disposed in biting relation to the band 10 avoid any possibility of the lowering of the fence concentrically about this band or the creeping of the band in a downward direction when embracing the trunk A of the tree. Additionally, these blocks 13 support the shield 19 in the manner as shown in Figures 1 and 3 of the drawings.

The stem 33 when actuated will regulate the flow of the poisonous liquid 32 from the reservoir 31 or the supply thereof or its flow can be cut off entirely at selected times.

The wires 15 next to the blocks 13 at their lower ends prevent the outward working of these blocks from between the staves 12 of the fence and retain the said blocks in their biting relation to the band 10.

The fence together with the shield 19 can expand or spread concurrently with the growth of the trunk A of the tree, the springs 18 being so mounted and connected with the members 16 for this purpose. The bolts 17 merely hold assemblage of the springs 18 and the said members as the said bolts freely play through the members 16 so as not to retard expansion or spreading of the device.

The staves 12 of the fence and the blocks 13 are loosely strung upon the wires 15 under the assemblage of the device so that the said fence with the blocks can spread or expand corresponding to the growth of the trunk A of the tree. The ends 25 of the pipe sections 24 separate under the expansion or spreading of the fence and the shield.

The poisonous liquid distributed by the pipe sections 24 will wet the upper surface of the shield 19 and it is impossible for insects to make upward progress on the tree and when contacting with such liquid will be killed while the shield effects a barrier for the upward crawling of the insects on said tree from beneath said shield.

Each part of the coupling nipple 27 has the passage 49 therein which leads from the font 30 when attached to this nipple into the pipe section 24 common thereto. Thus these pipe sections 24 have separable feeds from the font 30 of the reservoir 31, the liquid within the latter being delivered to the respective pipe sections 24 in the working of the device.

What is claimed is:

1. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, and liquid supply means associated with said hood for delivering poisonous liquid thereon and to the absorbent band.

2. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, and means for regulating said supply means.

3. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, and an upturned portion at the outer periphery of the hood forming a trough.

4. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, an upturned portion at the outer periphery of the hood forming a trough, and means included with the fence for the expansion thereof.

5. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, an upturned portion at the outer periphery of the hood forming a trough, means included with the fence for the expansion thereof, and means included with the hood for the spreading thereof concurrently with the expanding of the fence.

6. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, an upturned portion at the outer periphery of the hood forming a trough, means included with the fence for the expansion thereof, means included with the hood for the spreading thereof concurrently with the expanding of the fence, and a sectional perforated discharge element included with said supply means superposed relative to said hood.

7. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, an upturned portion at the outer periphery of the hood forming a trough, means included with the fence for the expansion thereof, means included with the hood for the spreading thereof concurrently with the expanding of the fence, a sectional perforated discharge element included with said supply means superposed relative to said hood, and means clamping said element in working relation to the hood and fixed to the fence.

8. A device of the character described comprising an absorbent band for training about a tree trunk, a fence exteriorly about said band when trained about the trunk and involving flexibly connected staves, gripping means built with said fence and engageable with the band, a conoidal hood about said fence and supported by said gripping means, liquid supply means associated with said hood for delivering poisonous liquid thereon and to the absorbent band, means for regulating said supply means, an upturned portion at the outer periphery of the hood forming a trough, means included with the fence for the expansion thereof, means included with the hood for the spreading thereof concurrently with the expanding of the fence, a sectional perforated discharge element included with said supply means superposed relative to said hood, means clamping said element in working relation to the hood and fixed to the fence, and flexible strands trained through the staves of said fence and having anchored terminals.

WILLIAM J. MACFEE.